United States Patent [19]
Yost et al.

[11] 3,834,680
[45] Sept. 10, 1974

[54] AIR CONDITIONING APPARATUS FOR A VEHICLE CAB

[76] Inventors: Howard S. Yost, 207 8th Ave., Greeley, Colo. 80631; Wesley Max Walker; Dean Max Walker, both of 629, Casper, Wyo. 82644

[22] Filed: June 12, 1972

[21] Appl. No.: 261,962

[52] U.S. Cl.............................. 261/92, 261/DIG. 4
[51] Int. Cl................................................ B01f 3/04
[58] Field of Search....................... 261/92, DIG. 4; 62/DIG. 16; 98/2.11, 2.14

[56] References Cited
UNITED STATES PATENTS

| | | | |
|---|---|---|---|
| 2,516,103 | 7/1950 | Brown................................... | 261/92 |
| 2,596,324 | 5/1952 | Carpenter et al..................... | 261/92 |
| 2,673,079 | 3/1954 | Plunk................................... | 261/92 |
| 2,729,436 | 1/1956 | Norris................................... | 261/92 X |
| 3,352,297 | 11/1967 | Martin et al........................ | 261/92 X |
| 3,606,982 | 9/1971 | Anderson............................. | 261/DIG. 4 |
| 3,610,589 | 10/1971 | Paulin................................. | 261/92 X |

*Primary Examiner*—Tim R. Miles
*Assistant Examiner*—Richard L. Chiesa
*Attorney, Agent, or Firm*—Van Valkenburgh, Lowe & Law

[57] ABSTRACT

An air cooler and cleaner for a truck cab or the like formed as a comparatively flat, box-like unit adapted to be mounted upon the top of a truck cab. Air flowing into this cooler will move through a rotating, cylindrical filter and thence through a duct and into the vehicle cab. A reservoir is provided in the lower portion of the cooler through which the cylindrical filter moves to continuously wet and wash the fibers thereof.

6 Claims, 5 Drawing Figures

PATENTED SEP 10 1974

AIR CONDITIONING APPARATUS FOR A VEHICLE CAB

This invention relates to air conditioning equipment, and more particularly to a portable water-type air conditioner which is especially adapted to clean and cool the air within a small enclosure such as in a vehicle cab.

The invention is particularly designed for application to the driver's cabs of relatively large vehicles, such as trailer trucks and the like, and for use on driver's enclosures of various types of agricultural, excavation road building equipment where it is especially desirable to maintain a clean and comfortable atmosphere about the driver of the vehicle.

Accordingly, the principal object of the invention is to provide a highly efficient, economical and relatively low priced air conditioning unit which can be quickly installed upon the roof of a vehicle cab or similar enclosure to maintain a continuous flow of evaporatively-cooled, filtered, outside air to the operator within the enclosure at all times.

Attempts have been made to accomplish the above object, for instance, such as shown in prior U.S. Pat. Nos. 2,237,497 (4/8/41); 2,769,620 (11/6/56); 3,273,867 (9/20/66); and 3,583,174 (6/8/71). These attempts have not been universally, commercially satisfactory due to the excessive overhead space requirements and to the fact that troublesome pumps and water distributing nozzles were required to clean and dampen the filters employed therein.

Another object of the invention is to provide a novel and improved water-type air conditioner which is especially suited for a vehicle cab and which is a small, flat, compact unit requiring a minimum of space above the roof of a vehicle cab to permit the vehicle to easily pass beneath overpasses, trees and other ordinary overhead obstructions.

Another object of the invention is to provide a novel and improved, portable air conditioning unit of an exceedingly simple construction which will not require pumps and nozzles of the type commonly used in devices of this type.

Other objects and advantages reside in the detailed construction of the invention, which is designed for simplicity, economy and efficiency. These will become more apparent from the following description.

In the following detailed description of the invention, reference is made to the accompanying drawing which forms a part hereof. Like numerals refer to like parts in all views of the drawing and throughout the description.

Figure 1:
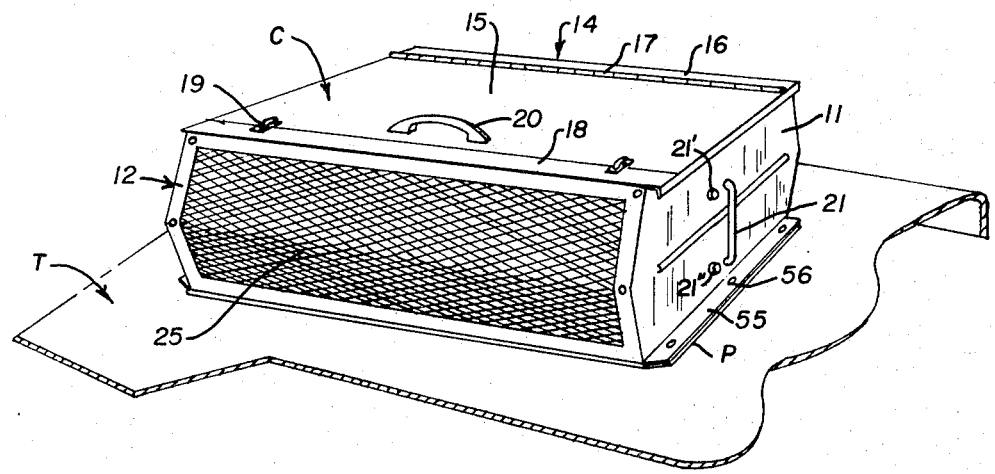
FIG. 1 is a perspective view of a preferred embodiment of the cooler as it appears when mounted upon the top of a truck cab, the figure showing only a fragmentary portion of the top of the cab.
Figure 2:
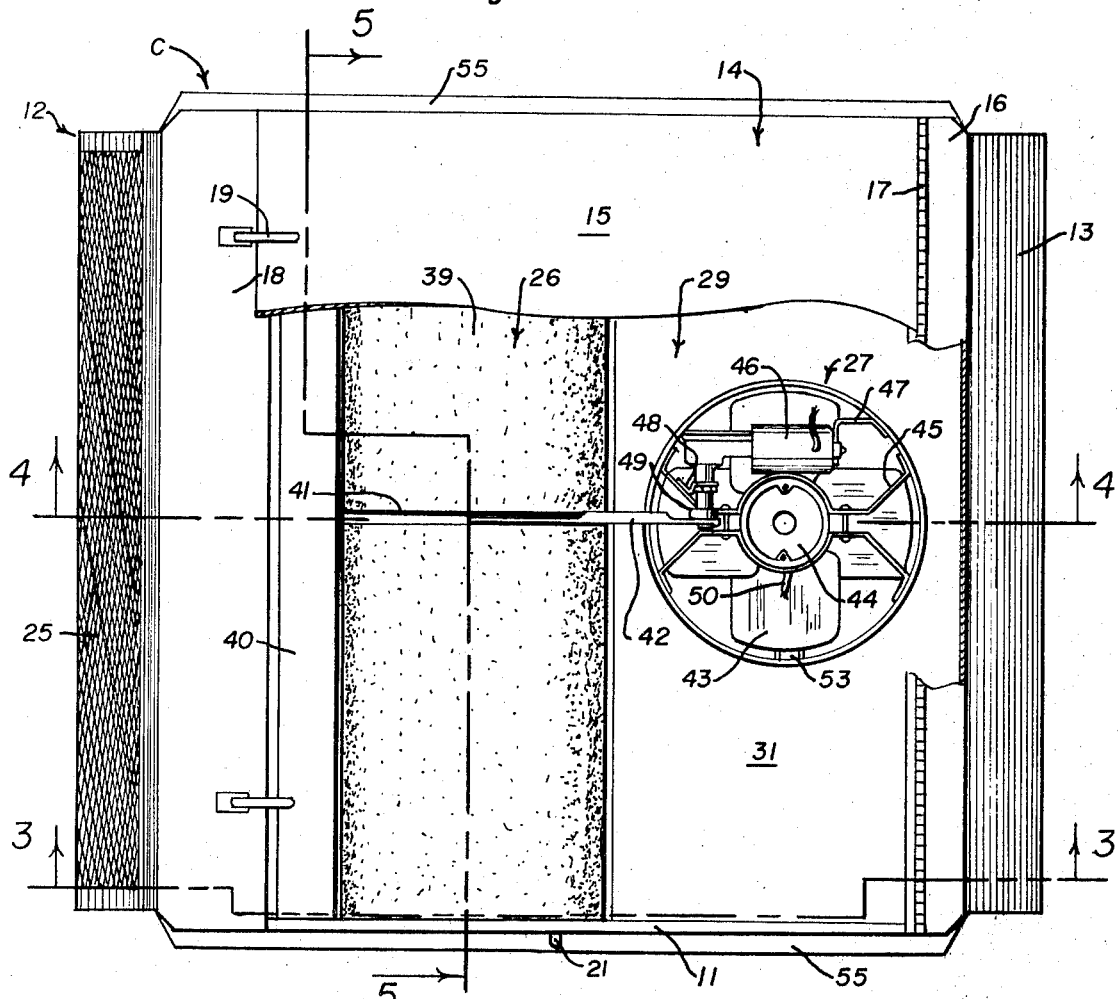
FIG. 2 is a plan view of the cooler unit shown at FIG. 1, but with a portion of the top cover and a portion of a top frame member being broken away to illustrate the interior of the unit.

Referring more particularly to FIG. 1 of the drawing, the improved cooler C is formed as an enclosed, comparatively flat, longitudinally-symmetrical, box-like unit which is adapted to be mounted upon the top T of a truck cab. The box-like housing is rectangular in plan and its basic arrangement will include a bottom 10, left and right sidewalls 11, a front wall 12, a rear wall 13 and a top 14, all as hereinafter further described.

The top 14 includes a flat lid 15 which is fastened to a rear top frame member 16 by a piano hinge 17 to lie flatly upon the top edges of the sides and upon the edge of a front top frame member 18 when closed. Latches 19 normally hold the lid closed. It is opened by a handle 20.

The air flow through this cooler will be through a reticulated grille inlet 25 at the front wall 12, thence through the walls of a transverse cylindrical filter drum 26 within the unit and thence from a cylindrical exhaust duct 27 extending through and depending a short distance below the bottom 10 of the housing adjacent to the rear wall 13 thereof. In mounting this cooler upon a cab top T, a hole H will be provided in the cab top to receive the depending portion 27a of the exhaust duct to effect communication between the cooler and the interior of the cab as in the manner illustrated at FIG. 4.

This cooler is preferably built according to conventional sheet metal fabricating procedures with the bottom 10, sidewalls 11 and rear wall 13 being joined with water-tight seams. A transverse interior wall 28 upstands from the front edge of the bottom 10 to reach approximately two-thirds the height of the unit. A water reservoir is thus provided within the cooler back of this interior wall 28 having a selected, normal depth of approximately one-third of the height of the unit as in the manner illustrated. Likewise, the cylindrical exhaust duct 27 is sealed at the bottom 10 to upstand inside the unit a height which corresponds with the height of the wall 28. A splash baffle 29 extends transversely across the rear portion of the cooler and the splash baffle 29 consists of a wall portion 30 upstanding from the bottom 10 at the approximate center of the cooler and extending to a height slightly less than one-half the height of the cooler. This splash baffle also has a horizontal plate 31 extending rearwardly from the wall portion 30, about the exhaust duct 27 and to the rear wall 13. This plate 31 will be above the normal water level of the cooler and will thus restrain splashing of the water which might otherwise splash into the exhaust duct. Passages 32 are provided at the foot of the wall portion 30 to communicate from the rear to the forward portion of the cooler C.

The transverse filter drum 26 is located in the forward portion of this cooler between the interior wall 28 and the wall portion 30 of the splash baffle 29. This cylindrical filter drum 26 is mounted upon a shaft 33 which extends across the cooler to be carried in bearings 34. The bearings slidably fit in open, slot-like sockets 35 of U-shaped clips 36 secured to the inner faces of the opposing sidewalls 11. The shaft supports a disc-shaped head 37 at each end adjacent to the bearings 34 and the heads, in turn, support a cylindrical open grille 38 of an expanded metal mesh, a wire frame or similar reticulated structure. This grille 38 supports a cylindrical, tubular filter sleeve 39. This sleeve is of a pore foam material as further described. To remove this filter drum for inspection, cleaning or replacement, it is simply lifted out of the cooler C and the bearings 34 will simply slide out of the open sockets 35.

Figure 3:
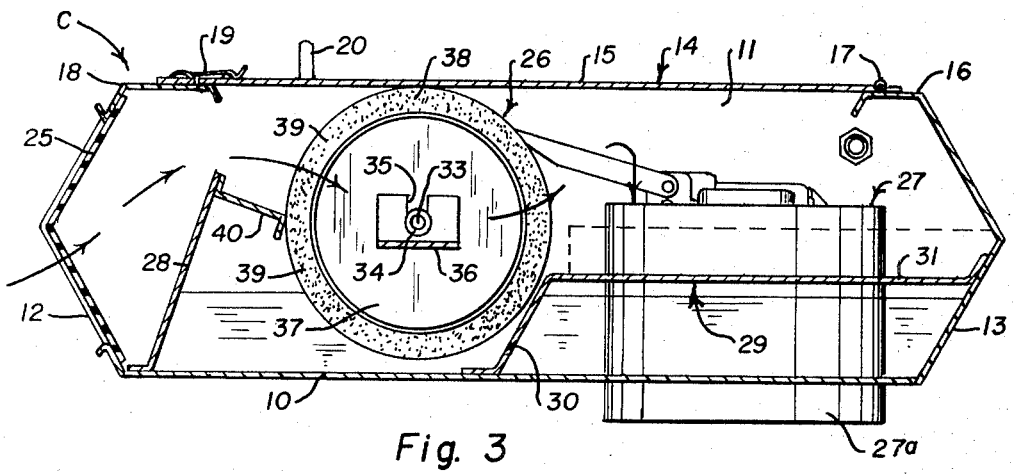
FIG. 3 is a longitudinal sectional view of the cooler unit as taken from the indicated line 3—3 at FIG. 2.
Figure 4:
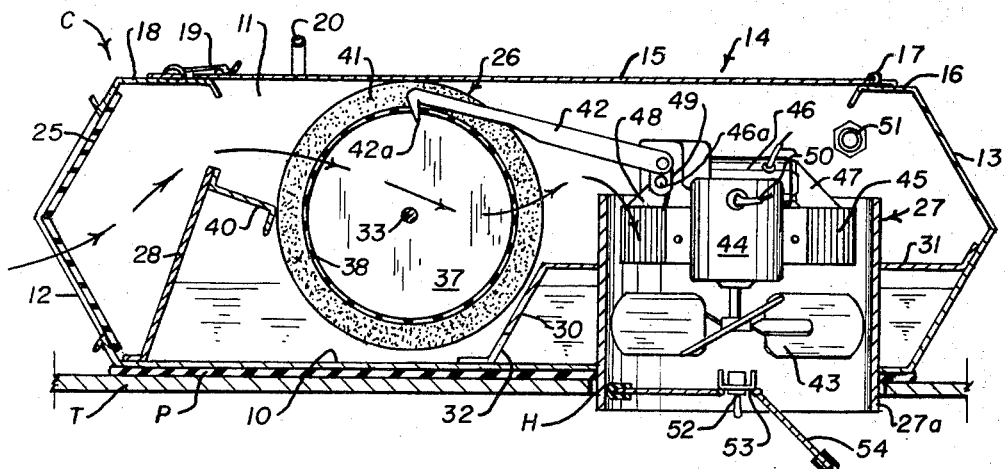
FIG. 4 is a longitudinal sectional view of the unit as taken from the indicated line 4—4 at FIG. 2, but showing also a fragment of the top of a truck upon which the cooler is mounted and a gasket between the cooler and the top of the truck.
Figure 5:
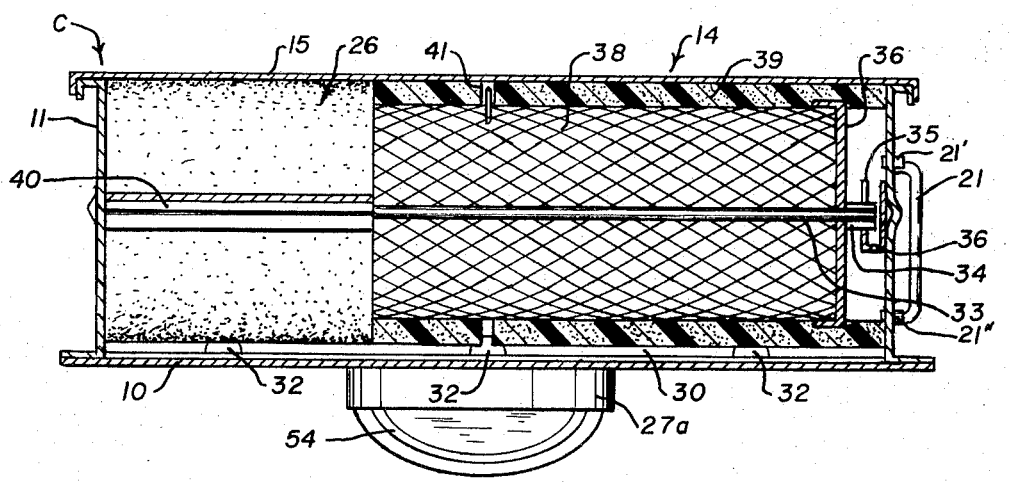
FIG. 5 is an offset transverse sectional view as taken from the indicated line 5—5 at FIG. 2.

The filter sleeve 39 has an outside diameter which is substantially the same as the height of the cooler and in operation, it will contact the lid 15 of the top of the cooler and also contact a turned, rearward edge of a transverse flange baffle 40 connected to the upper edge of the interior wall 28 as illustrated at FIGS. 3 and 4. The length of the filter sleeve 39 is the same as the width of the cooler so that it will extend to each sidewall 11 as shown at FIG. 5. Accordingly, air entering the grille inlet 25 and into the cooler must pass through the filter sleeve 39 since the contact of this filter sleeve is with the top lid 15, the rear edge of the flange baffle 40 and the two sidewalls 11. This effectively seals any opening which would prmit airflow about the filter drum 26 and forces the air to flow laterally through the filter sleeve 39 as along a path indicated by the arrows at FIG. 4. To complete this filter drum 26, a circumferential slot 41 is provided in the filter sleeve 39 at the middle of the drum to permit the hook 42a of a pawl 42 to engage the wires forming the cylindrical grille 38 for simple, easy rotation of the drum as hereinafter described.

The filter sleeve 39 may be of any open-pore, flexible foam such as polyurethane foams which are commonly available; however, it was found that a preferred type of open pore foam is provided by the Scott Paper Company of Philadelphia, Pennsylvania and is marketed as SCOTT FILTER FOAM. This material is exceptionally porous and permeable and permits a free flow of air through the filter without undue clogging as the moisture in the foam coalects particles of dust. Also, dust particles collected by the foam may be easily washed from the foam.

A fan 43 is mounted within the cylindrical exhaust duct 27 and its motor 44 is carried by a spider 45 secured to the inner wall of the exhaust duct 27. In addition, a low speed drive 46, formed by a small motor and reducing gear combination, is mounted at the top of the exhaust duct 27 and upon brackets 47 and 48 which are connected to the wall of the exhaust duct and a leg of the spider 45 respectively. A drive shaft 46a of this drive unit will rotate at a slow speed and is oriented transversely with respect to the housing of the cooler and parallel to the axis of the filter drum 26. This drive shaft 46a carries a crank 49 which, in turn, connects with the pawl 42 to reciprocate the pawl 42 and permit the hook 42a thereof to sequentially engage the wires forming the cylindrical grille 38 and thereby rotate the filter drum 26.

Electrical leads 50 from the fan motor 44 and the drive unit 46 are not shown in detail; however, these leads will be extended from the cooler through a suitable opening 51 which may be located in a sidewall of the unit. The electrical leads will also connect with a simple switch 52 which may be mounted on a crossbar 53 at the bottom of the exhaust duct 27 at a conveniently accessible location. This crossbar 53 also supports a pair of simicircular baffles 54, each of which is pivoted to the crossbar to swing upwardly to close off half of the exhaust duct. The manner in which these baffles are connected to the crossbar will permit an operator to set them at any desired position, such as the position illustrated at FIG. 4, to better control the direction and the amount of air flow into the cab.

The application and the operation of this unit is manifest from the foregoing description. It is mounted upon the top of a truck cab or the like which has been previously prepared by cutting the hole H to receive the lower end of the exhaust duct. The cooler is preferably placed upon a rubber pad P or any other suitable pad or gasket as illustrated at FIG. 4. The cooler C includes a suitable flange 55 outstanding from the base of each sidewall 11. Each flange 55 has mounting holes in it to receive mounting bolts 56 to secure the cooler to the top of the truck as indicated at FIG. 1.

Once the cooler is mounted upon the top of a truck cab and the electrical circuits are connected, the unit is filled with water in any suitable manner to its approximate one-third level. To properly check, fill, and drain water to and from the reservoir, a water level gauge 21 is provided at one side wall of the unit and a filling orifice 21' and a draining orifice 21'' are provided alongside the gauge. These orifices are normally closed by conventional plugs, as illustrated at FIGS. 1 and 5. It is then ready for use. Ordinarily, the front wall grille will be facing in the direction of movement of the truck and such will enhance the movement of air through the cooler. As the unit operates, the pawl will reciprocate to rotate the filler drum 26 at a slow rate of speed. This rotation will move the filter drum 26 through the water to saturate the fibers of the filter sleeve 39. Thus, air moving through this filter will be cooled by the humidifying action of the water held by the sleeve 39. The saturated fibers of the sleeve will also pick up dust particles and absorb undesirable vapors to clean the air and as the filter sleeve moves through the water in the reservoir portion of the cooler, most of these particles will be washed from the sleeve.

As further refinement to the invention, a sponge padding 60 may be placed upon the horizontal plate 31 of the splash baffle to absorb any water which may splash upwardly above the plate 31 and into the exhaust duct 27, as when the vehicle carrying the cooler suddenly starts or stops.

We have now described our invention in considerable detail. However, it is obvious that others skilled in the art can build and devise alternate and equivalent constructions which are nevertheless within the spirit and scope of our invention. Hence, we desire that our protection be limited, not by the constructions illustrated and described, but only by the proper scope of the appended claims.

We claim:

1. An air conditioning apparatus for a vehicle cab, or the like having a substantially flat roof and an opening in the roof, said apparatus being adapted to be mounted upon the roof over the opening to deliver cool, clean and humidified outside air through the roof opening and into the cab, wherein said air conditioning apparatus includes:

a. an enclosed, comparatively-flat, box-like housing including walls, a top and a floor and being adapted to be partially filled with water to a selected level, with the upper portion forming an air passageway above the water level;

b. an intake in the wall of the housing, at one side thereof, to receive outside air, c. an air discharge tube within the housing near the wall opposite the intake, said tube upstanding from the floor of the housing to extend to the air passageway above the water level, said tube being in registration with the aforesaid cab roof opening to permit air to flow from the housing, downwardly through the tube and into the cab;

d. a cylindrical, horizontal, foraminous filter drum within the housing between the intake and the discharge, with the ends of the drum extending to opposite walls of the housing, the top cylindrical surface of the drum being at the top of the housing and the lower portion of the drum being in the lower portion of the housing below the water level whereby the drum blocks the air passageway and forces all air flowing through the passageway to flow through the drum;

e. a horizontal baffle means within the housing at the discharge side of the filter drum in spaced parallelism with the floor, at the said selected level to form the bottom surface of said air passageway, said baffle extending from the walls of the housing to the filter drum with the discharge tube extending upwardly and through this baffle means whereby to prevent water below the baffle means from splashing into the discharge tube;

f. a means for slowly rotating the drum to move wetted portions at the bottom of the cylinder from below the water level to traverse the air passageway; and g. air-moving means adapted to move air through the apparatus.

2. In the apparatus defined in claim 1, wherein:
a short portion of the tube extends below the floor of the housing and into the aforesaid cab roof opening.

3. In the air conditioning apparatus defined in claim 1, wherein:
a. the aforesaid filter drum includes a sleeve mounted upon an open, reticulated wire frame and the sleeve includes a circumferential slot;
b. said drum rotating means includes a hooked pawl extending into the slot with the hook thereof engaging one of the wire members of the reticulated drum frame; and
c. a motor and crank means adapted to reciprocate the pawl to shift the hook thereof from one wire member to the next.

4. In the air conditioning apparatus defined in claim 1, wherein said baffle means includes:
a splash baffle upstanding from the bottom of the housing between the filter drum and the duct constituting the discharge opening.

5. In the apparatus defined in claim 1, including:
a second baffle means within the housing at the intake side of the filter drum in spaced parallelism with the floor thereof and at the said selected level, and extending from the walls of the housing to the filter drum to prevent water below the baffle means from splashing into the intake opening.

6. An air conditioning apparatus to clean and himidify outside air and discharge the same into a vehicle cab, or a like enclosure, and comprising:
a. a housing structure adapted to be mounted upon the vehicle cab and having an intake opening to receive outside air, a discharge opening directed into the cab to discharge cleaned and humidified air therein, a passageway through the upper portion of the housing connecting the intake and discharge openings and a water reservoir below the passageway;
b. a horizontal filter drum within the housing having an open reticulated wire frame carrying a generally cylindrical, foraminous sleeve, with the upper portion of the drum traversing the aforesaid passageway and with the lower portion of the drum being submerged in the water reservoir;
c. air-moving means adapted to move air through apparatus, from the intake opening, through the passageway, through the drum in the passageway and from the discharge opening;
d. a circumferential slot means in the sleeve exposing wires of the frame; and
e. a drum rotating means for slowly rotating the drum to move wetted portions of the sleeve from the reservoir and to the passageway to expose wetted portions to air moving through the passageway including a hooked pawl extending into the slot with the hook thereof engaging one of the frame wires of the filter drum and a motor and crank means adapted to reciprocate the pawl to shift the hook thereof from one frame wire to the next.

* * * * *